United States Patent
Vuggrala et al.

(10) Patent No.: US 11,457,370 B2
(45) Date of Patent: Sep. 27, 2022

(54) SYSTEM AND METHOD FOR SEAMLESS LIVE UPGRADE OF ACCESS POINTS USING NEIGHBOR DATA

(71) Applicant: HEWLETT PACKARD ENTERPRISE DEVELOPMENT LP, Houston, TX (US)

(72) Inventors: Shravan Kumar Vuggrala, Bangalore (IN); Raghunandan Prabhakar, Bangalore (IN); Hsiu-Wei Liu, Santa Clara, CA (US); Rishabh Gupta, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/120,073

(22) Filed: Dec. 11, 2020

(65) Prior Publication Data
US 2022/0191714 A1 Jun. 16, 2022

(51) Int. Cl.
*H04W 24/02* (2009.01)
*H04W 48/02* (2009.01)
*H04W 48/20* (2009.01)

(52) U.S. Cl.
CPC .......... *H04W 24/02* (2013.01); *H04W 48/02* (2013.01); *H04W 48/20* (2013.01)

(58) Field of Classification Search
CPC ...... H04W 24/02; H04W 48/02; H04W 48/20
USPC ......................................................... 455/419
See application file for complete search history.

(56) References Cited

U.S. PATENT DOCUMENTS

| 8,214,470 B2 | 7/2012 | Quilty | |
| 2008/0076411 A1* | 3/2008 | Khetawat | H04W 24/02 455/432.1 |
| 2009/0129291 A1* | 5/2009 | Gupta | H04W 8/26 370/254 |
| 2017/0195459 A1* | 7/2017 | e Costa | H04L 67/025 |

FOREIGN PATENT DOCUMENTS

| CN | 107645408-107645408 | 1/2018 |
| CN | 108064026 A | 5/2018 |
| JP | 2004533762 A | 11/2004 |

OTHER PUBLICATIONS

Kang, H-S., et al., "Beacon Node Based Localization Algorithm Using Received Signal Strength(RSS) and Path Loss Calibration for Wireless Sensor Networks," The Journal of the Institute of Internet, Broadcasting and Communication; vol. 11 Issue 1, pp. 15-21, Feb. 28, 2011, https://www.koreascience.or.kr/article/JAKO201125736639806.page.

* cited by examiner

*Primary Examiner* — Ted M Wang
(74) *Attorney, Agent, or Firm* — Hewlett Packard Enterprise Patent Department

(57) ABSTRACT

Systems and methods are provided for performing a live upgrade process of one or more devices (e.g., access points (APs), etc.) in a large scale network environment. For example, the system can use neighbor path loss data between the APs. The neighbor path loss data may identify the signal strength between two points as an indication of the ability to transmit power and receive power from the individual APs. When the ability to transmit and receive power is present in one AP is unavailable the user device may connect to a second AP to avoid losing connectivity. This neighbor path loss data may be utilized to perform a live upgrade process of APs in parallel at multiple locations of the user site.

20 Claims, 7 Drawing Sheets

SYSTEM AND METHOD FOR SEAMLESS LIVE UPGRADE OF ACCESS POINTS USING NEIGHBOR DATA

BACKGROUND

Network devices are pervasive throughout society. These devices provide basic operations for many technical operations. However, these devices need constant patching and updating to maintain a minimum level of operability and security features. When incorporated with large-scale network domains, these devices can help provide network connectivity to various user devices using access points (APs). However, when the APs need to be upgraded and rebooted, other devices are affected and unable to access the network while the AP is down. Better methods are needed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
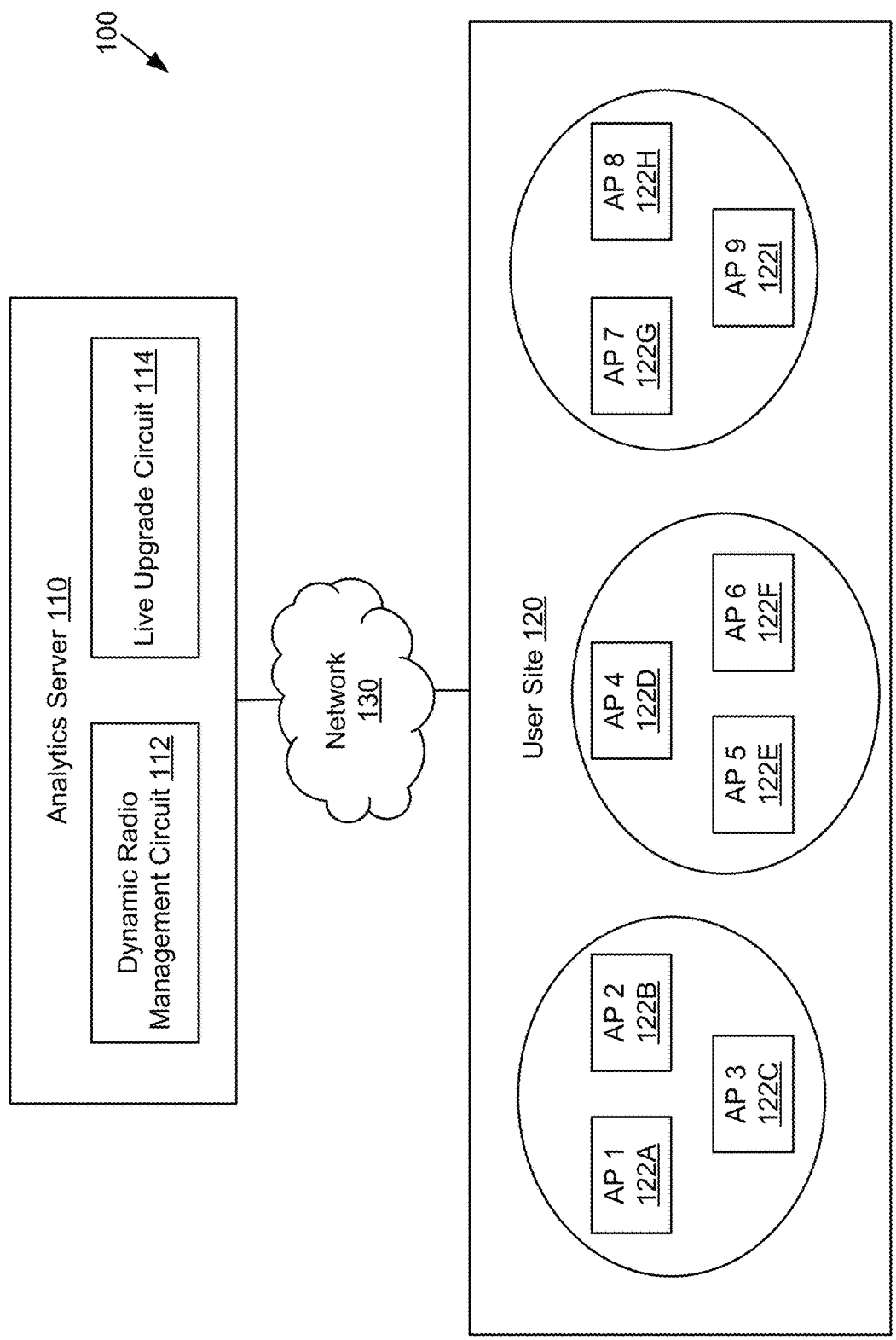
FIG. 1 illustrates a computing environment, comprising an analytics server, user site, and network, in accordance with embodiments of the application.

The figures are not exhaustive and do not limit the present disclosure to the precise form disclosed.

DETAILED DESCRIPTION

Updating devices that provide basic operations for many technical operations is cumbersome and inefficient, especially for network domains that stretch across many buildings and hundreds or thousands of devices.

In large scale access point (AP) deployments, upgrade processes may perform a live upgrade. The live upgrade process may perform an automatic updating of software via a communication network. For example, on startup, an application may query a backend server for updates. In other examples, a backend system may push a software update to the device while the device is still providing functionality to a user. At times, the live upgrade may be performed unannounced to the user so that the device is upgraded without prior knowledge to the user.

The live upgrade process may communicate with access points using a radio channel number of the APs. For example, a mobility conductor device (e.g., wireless LAN controller, a device that manages APs that allow wireless devices to connect to the network, etc.) may divide the APs into partitions according to their base channels. A base channel may comprise a single communication channel where data packages are transmitted, which corresponds with the specific system architecture or location.

Once APs are divided into partitions according to their base channels, the mobility conductor device may assign a target controller to each partition, leaving one controller unassigned by design. The target controller may correspond with a wireless switch device that provides a wide range of wireless and wired network mobility, security, centralized management, auditing, authentication, and remote access. In some examples, the target controller may become the AP Anchor Controller (AAC) that the AP will connect to after the code upgrade.

Then the mobility conductor device may access a centralized image (e.g., a copy or file of a software application, a copy of an upgraded file for the live upgrade process, etc.). For example, the mobility conductor device may operate as a lead or head controller to automatically upgrade its associated target controllers by sending an image from an image server to one or more target controllers. Different types of images may be uploaded to the server and only the type of image that corresponds with the target controller will be sent. This image may be pushed to each target controller.

Once the image copy is successful on all target controllers (e.g., the target controller of each of the corresponding partitions, etc.), one target controller is chosen and a command is transmitted to the target controller to reboot. Upon successful reboot, the target controller may execute the upgraded application or file and form a cluster by itself. In these traditional live upgrade processes, the APs and user devices that were on the target controller may fail over to their standby controllers, based on existing AP rules that require AP pre-existing standby tunnels and clients state duplication.

Once the mobility conductor device gets confirmation that the upgraded target controller is in an active state, it transmits the image (e.g., upgraded file for the live upgrade process, etc.) as part of a process prior to the live update (e.g., pre-load upgrade process) to all the APs that had the upgraded target controller as their target partition one at a time. After each partition image pre-load, the APs in that partition receive a command (e.g., to reboot, restart the upgraded application or file, to disable network access to a user device, etc.). During this reboot process of all APs in the partition, the user device may lose network connectivity despite the fail over process of the target controller described above. This may happen when there is a gap in a network coverage area for the user device, such that the user device is unable to connect to another AP that is not actively being rebooted. When the APs are rebooted, the user device may be unable to connect to another AP without moving to a different coverage area.

Upon reboot, the APs come up and connect to their upgraded target controller as their AP Anchor Controller (AAC). Other devices are then pre-loaded and rebooted to come back up and terminate their tunnels on the target controller. This mechanism of controller reboot, AP image pre-load followed by a reboot on a per partition basis, is repeated for other controllers and the next partitions (e.g., partitions 1 and 2) to move the rest of the APs to the upgraded other controller that rejoined the upgraded cluster. Once the entire live upgrade process is complete and all cluster controllers and their APs are upgraded to the upgraded application or file, cluster leader may load balance APs and/or user devices in a stateful manner as needed.

Live upgrade processes such as these often have minimal impact on associated environments and user devices connecting to APs, since only a single channel becomes unavailable and user devices would naturally roam to a nearby AP. However, in these live upgrade processes, the live upgrade partitions are generally formed of APs having the same radio channel number and the live upgrade process is performed on all APs in a partition. Upon completion of a partition, the live upgrade process moves to the next partition. Hence APs in different locations or sites may fall into different radio channel numbers which creates more partitions and increases the upgrade time when the partitions are upgraded sequentially.

With networks that require a high availability with a minimal amount of time dedicated to device maintenance (e.g., rebooting, etc.), live upgrade processes, such as the one described, may be unusable. This is at least partially based on the APs falling into different radio channel numbers and the mobility conductor device dividing the APs into partitions according to their base channel, causing a disruption to the network connection between the user device, AP, and controller. This problem exists even for large campus deployments where some areas like buildings are treated as sites in the campus and are geographically separated. As such, some live upgrade processes such as these are not efficient since the process is performed sequentially, from a first building with a plurality of APs to upgrade, to a second building with a second plurality of APs to upgrade, and so on. As such, traditional live upgrade processes may cause user devices to lose network connectivity while all of the APs in a single partition are upgraded and rebooted at the same time.

Embodiments described herein improves live upgrade processes, especially for large scale deployments (e.g., with several buildings and/or RF domains, etc.). For example, instead of using a radio channel number to form partitions, the live upgrade process uses neighbor path loss data (used interchangeably with "neighborhood path loss data") between the APs. The neighbor path loss data may identify the signal strength between two points as an indication of the ability to transmit power and receive power from the individual APs. When the first AP is unable to transmit and receive power, the user device may connect to a second AP to avoid losing connectivity. This neighbor path loss data may be utilized to perform a live upgrade process of APs in parallel at multiple locations of the user site.

As an illustrative example, the computing environment may include twenty APs distributed across various locations. The computing environment may include five RF partitions that correspond with individual buildings, floors, or other common areas that are separated from other RF partitions by distance or physical barriers (e.g., walls, valleys, etc.). The system can select one or more APs from each RF partition within an RF domain to upgrade. These selected APs may be upgraded in parallel from each RF partition, which can leave the other APs online and available to provide network connectivity to the user devices. The user devices may be ensured to maintain network connectivity based on the ability of the user device to connect to a second AP in the RF partition while the first AP is being upgraded and rebooted with the upgrades application or file. The ability to connect to the second AP is based on the neighbor path loss data that indicates the ability to transmit power and receive power from the individual APs. This confirmation may help ensure seamless client connectivity and reduce overall time of the upgrade significantly.

In the improved live upgrade process, the coordination of the deployment of multiple APs may be controlled by a backend cloud central server. The backend cloud server receives RF neighbor data and neighbor path loss data from the APs rather than using the radio channel number or base channels to form partitions. This could help confirm that each user device would be able to connect to an active AP while another AP was unavailable (e.g., AP is being rebooted within an adjacent area, without moving locations to acquire a network connection from a second AP, etc.). Using RF neighbor data, the server would determine (1) RF domains (e.g., individual structures) and (2) RF partitions within each RF domain. Each partition would ensure that user devices within each RF domain would not lose network connectivity once the server upgrades and sends a command to one or more APs (e.g., to reboot a subset of APs concurrently, to restart a process on the subset of APs, to disable network access to a user device, etc.), because the user device would be able to connect to a second AP in the partition once the first AP was unavailable in response to the command. Additionally, multiple APs would be upgraded concurrently in different partitions and RF domains without affecting user devices.

Embodiments of the disclosure differ from live upgrade systems, at least because the radio channel number and base channel data is replaced with RF neighbor data, in hopes of maintaining network connectivity for the user devices, as described herein. Additionally, embodiments of the disclosure differ from a dynamic ad hoc network. In ad hoc networks, information is transmitted between APs or other devices so that a collective decision can be made (e.g., transmitting information to other devices in the ad hoc network without a centralized processor or server, etc.). Here, even though information is still transmitted between the APs (e.g., RF neighbor data, neighborhood path loss data, etc.), each AP transmits the information to a server to identify the RF domains and the corresponding partition. The server would also transmit information to the APs based on the determined layout and transmit a command to particular APs to alter the functionality of the APS, with the intention of also maintaining connectivity between each user device connected to a partition of APs and the network. The connectivity between the user device and network may be maintained while a particular subset of APs are upgraded. As such, there is a balance between maintaining connectivity for the user devices and upgrading the APs as quickly as possible. This is not considered in dynamic ad hoc networks.

Various technical advantages are realized through use/implementation of embodiments disclosed herein. For example, multiple physical locations may be upgraded in parallel, rather than a sequential upgrade. As illustrated, a first AP may be rebooted and the user devices in the partition may connect to a secondary AP in the partition. This will allow the user devices to maintain network connectivity while the first AP is upgraded. This process may be repeated in multiple partitions, so that multiple APs may be upgraded concurrently (e.g., a first AP from a first partition, a second AP from a second partition, etc.). The user devices in each of the partitions can maintain connectivity to the secondary APs while the initial APs are rebooted. By performing the upgrade and reboot concurrently, the overall time to upgrade several APs may be reduced across a large network with several partitions.

Additionally, traditional systems do not account for RF neighbor data, including one or more RF domains or partitions computed based on path loss in order to perform the live upgrade. In some examples, the system may parallelize upgrade in remote access point (RAP) deployments. Additionally, by determining the RF domains (e.g., individual buildings) and partitions within each RF domain, subsequent site upgrades are protected when one AP in one site fails. Other APs at a different site are not affected.

Additionally, the live upgrade process may be initiated with a single activation from an entity associated with the user site, at least because an analytics server can manage and maintain the live upgrade process in parallel across multiple sites. In some examples, the analytics server may receive RF neighbor data to help form the RF domains and corresponding partitions. This may allow the entities to add or delete RF domains and corresponding structures from a user site definition without increasing complexity for the entity.

FIG. 1 illustrates a computing environment 100, comprising an analytics server 110, user site 120, and network 130, in accordance with embodiments of the application. In computing environment 100, analytics server 110 communicates with the user site 120 via network 130. Analytics server 110 is configured to implement a live update of one or more APs 122 (illustrated as AP1 122A, AP2 122B, AP3 122C, AP4 122D, AP5 122E, AP6 122F, AP7 122G, AP8 122H, and AP9 122I) located at user site 120. Analytics server 110 comprises a plurality of circuits, including dynamic radio management circuit 112 and live upgrade circuit 114.

Figure 2:
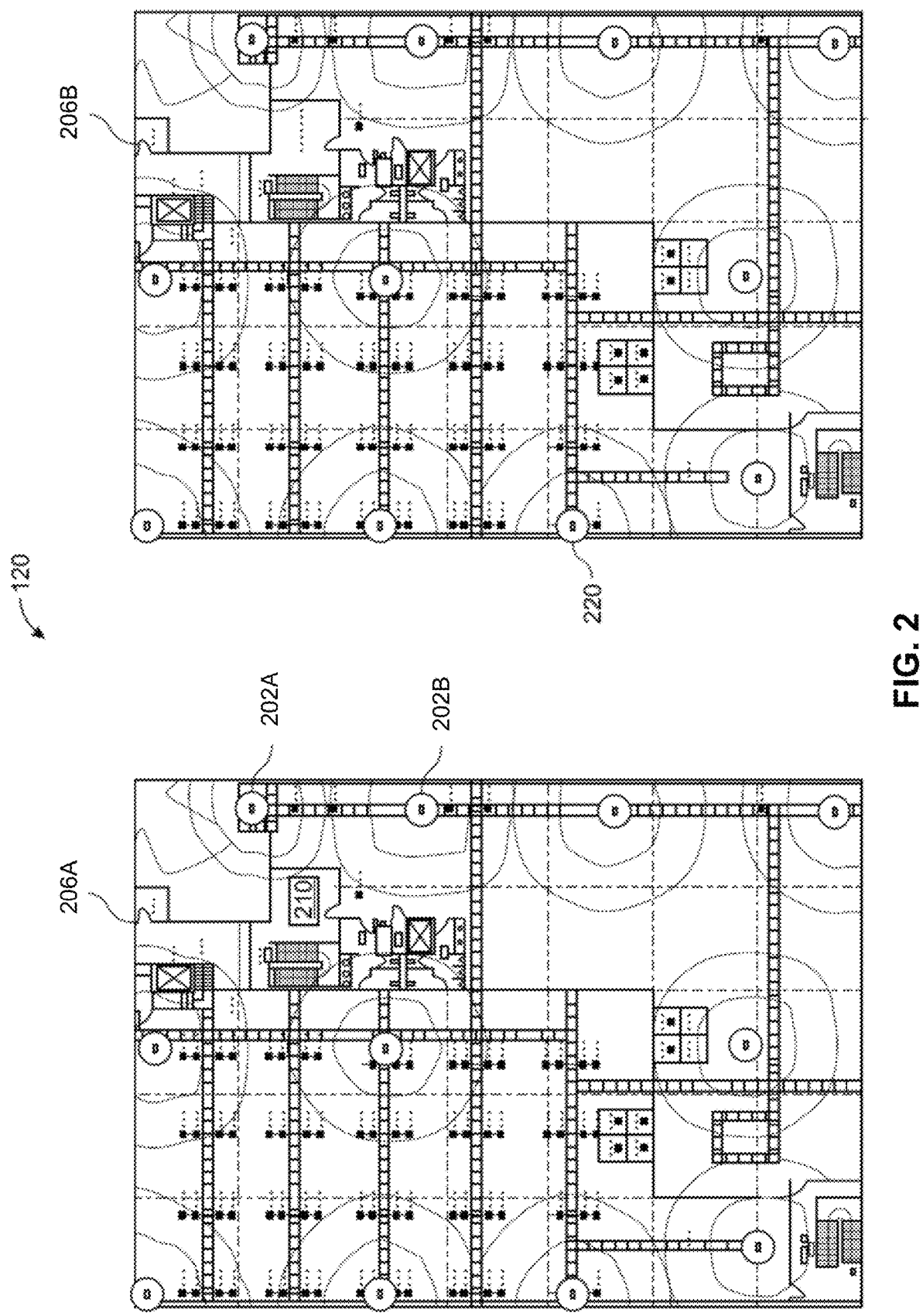
FIG. 2 illustrates a user site, in accordance with embodiments of the application.

User site 120 may comprise one or more APs and structures, as further illustrated with FIG. 2. For example, as illustrated in FIG. 2, user site 120 comprises a plurality of structures or separators 206 (illustrated as first structure 206A and second structure 206B), each of which comprise areas that an entity may want to provide network connectivity to user device 210. As user device 210 travels around the first structure 206A, user device 210 may maintain network connectivity by connecting to a plurality of APs 202 (illustrated as first AP 202A and second AP 202B) sequentially (e.g., based on the AP that provides the strongest signal to the network, etc.). Each of the APs can provide network connectivity to a plurality of user devices based on the ability of the user device to connect to a corresponding AP. As user device 210 travels to a second structure 206B, user device 210 may utilize similar network connectivity provided by the corresponding APs in the second structure 206B. Structures (e.g., branches or sites) which are geographically separated may fall into different RF domains and these RF domains can be considered as independent and be upgraded simultaneously during a future live upgrade process.

When user device 210 is located next to first AP 202A and second AP 202B in first structure 206A, user device 210 may connect to a network through first AP 202A. When first AP 202A is upgraded and rebooted, user device 210 may automatically reconnect to second AP 202B to maintain network connectivity. The upgrade process may be performed while the APs are live and actively providing network connectivity to user device 210. However, in traditional live upgrade processes, a third AP 220 in the second structure 206B may be unaffected by the ability to provide network connectivity to user device 210 and also is not included in the upgrade with the first structure 206A. This is inefficient because third AP 220 could be rebooted concurrently with either first AP 202A or second AP 202B and not affect the network connectivity of user device 210. Rather, in traditional live upgrade processes, the third AP 220 must wait to be upgraded because third AP 220 is in a different individual structure (and thus on a different RF domain) than first AP 202A and second AP 202B. In contrast, in embodiments of the application, the third AP 220 may be upgraded and rebooted concurrently with first AP 202A by implementing (1) RF domains (e.g., individual structures) and (2) RF partitions within each RF domain, as described herein.

Returning to FIG. 1, analytics server 110 comprises dynamic radio management circuit 112. Dynamic radio management circuit 112 is configured to determine (1) RF domains (e.g., individual structures) and (2) RF partitions within each RF domain associated with APs 122 using the RF neighbor data and neighbor path loss data received from the APs via network 130. For example, dynamic radio management circuit 112 may process the RF neighbor data and neighbor path loss data to determine which APs are in a similar structure (e.g., not one AP in the first structure can see a single AP in the second structure). The APs in the similar structure may be correlated with a single RF domain, based in part on the physical separator between the APs.

Figure 4:
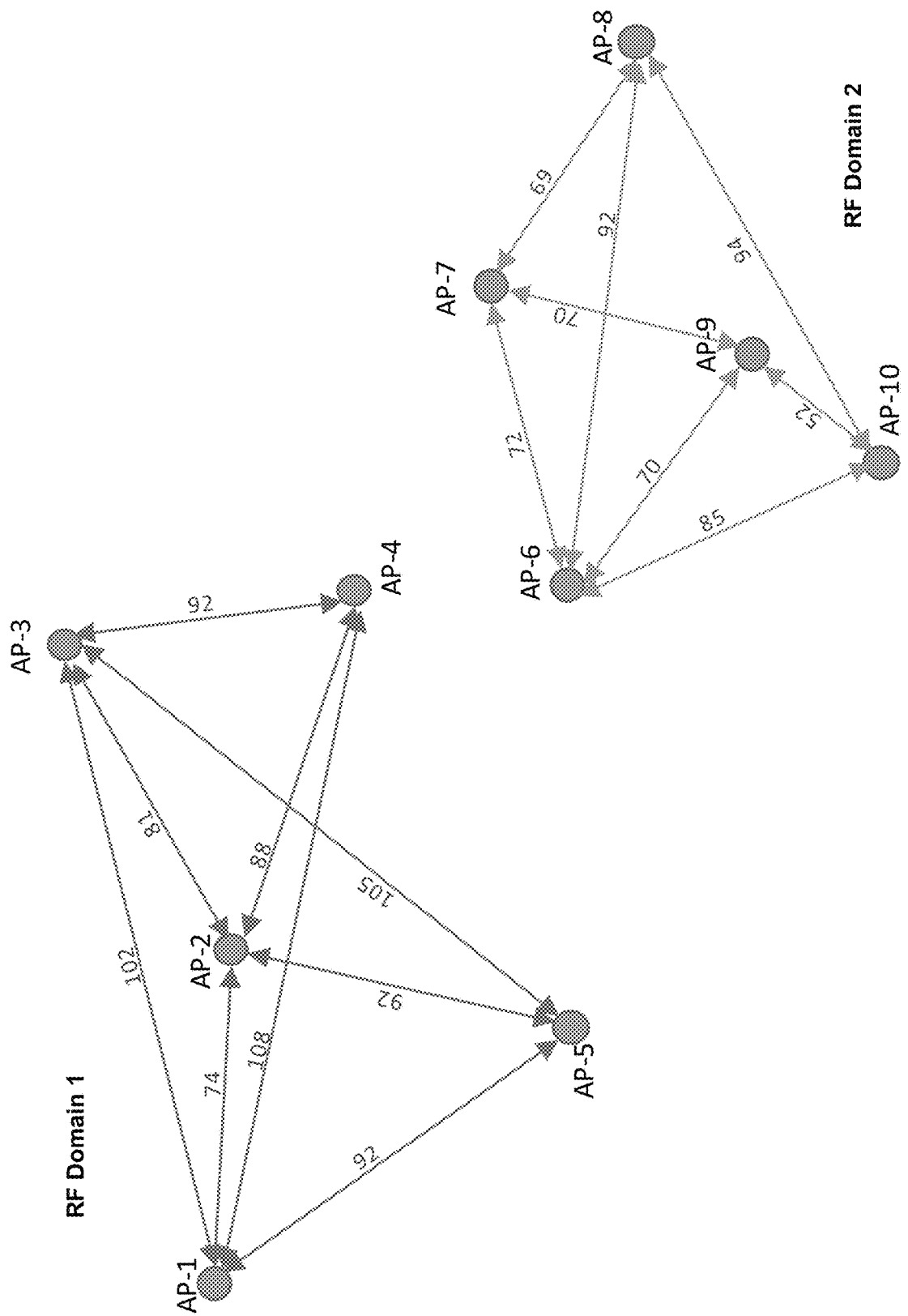
FIG. 4 illustrates a plurality of RF domains and APs, in accordance with embodiments of the application.

In some examples, graph theory may be used to determine RF domains. For example, an RF domain may correspond with a neighbor graph where vertices represent APs and edges indicate neighbor relationship. Each edge between two vertices indicates the two APs can hear each other, and the pathloss associated to the edge indicates how far away the two APs are (e.g., lower pathloss means closer, and vice versa). If there is no edge between two vertices, the APs may not hear each other. For example, as illustrated in FIG. 4, two RF Domains are illustrated. In RF Domain 1, AP-1 and AP-2 can hear each other with pathloss 74. AP-1 and AP-3 have pathloss 102. From AP-1's perspective, AP-2 is closer than AP-3. Additional information for FIG. 4 is provided herein.

Dynamic radio management circuit 112 may also determine the partitions. For example, dynamic radio management circuit 112 may determine each partition to ensure that user devices within the partition would not lose network connectivity once analytics server 110 upgrades and transmits a command to a first AP in the partition (e.g., via live upgrade circuit 114) to reboot the first AP. The determined partition may comprise the first AP and a second AP because the user device would be able to connect to a second AP in the partition once the first AP was rebooted. The APs in different RF domains may be irrelevant to determining the APs in each partition, because of the physical separation between the APs in the different RF domains may limit user devices from attempting to connect to the APs in the different domains without moving between the physical separation of the RF domains.

The partitions may be determined using RF neighbor data and/or neighbor path loss data. Analytics server 110 may use the pathloss data to create a connected weighted graph(s) where each node of the graph is one AP, and each edge of the graph is the link between an AP and a neighbor AP. A user device or AP may transmit a broadcast message and the devices that can receive the broadcast message may be identified with the RF neighbor data. Any loss of the broadcast message may correspond with the neighbor path loss data and identify the strength or weakness of the network connection from a particular location. If the pathloss metric between two APs is more than a threshold then it is not considered neighbor to that AP and if it is less than the threshold then it is considered a neighbor. The graph and corresponding APs may be used to identify partitions where an AP may be temporarily removed (e.g., rebooted) but other APs can cover for the temporary loss of the device. A partition of an RF domain can be limited to where a user device can roam without disassociation and data loss within the partition.

In some examples, graph theory may be used to determine partitions within RF domains. For example, a partition may be subgraph of an RF domain, so one RF domain consists of one or more partitions. To create partitions, some edges with largest pathloss values may be removed. This process can split one RF domain into smaller partitions. Dynamic radio management circuit 112 may continues this process until a predetermined partition size (e.g., five APs per partition out of 100 APs, etc.) is generated.

Dynamic radio management circuit 112 may transmit proactive channel assignments as well. The APs may receive the proactive optimization information of channel allocation via network 130. The proactive optimization information of channel allocation may be transmitted on a predetermined time threshold or interval to ensure the even distribution of channels to reduce co-channel interference (CCI) and improve channel reuse. Should a local RF event occur, such as an increase in the noise floor or a radar detection event occur, APs can automatically change channels.

Figure 3:
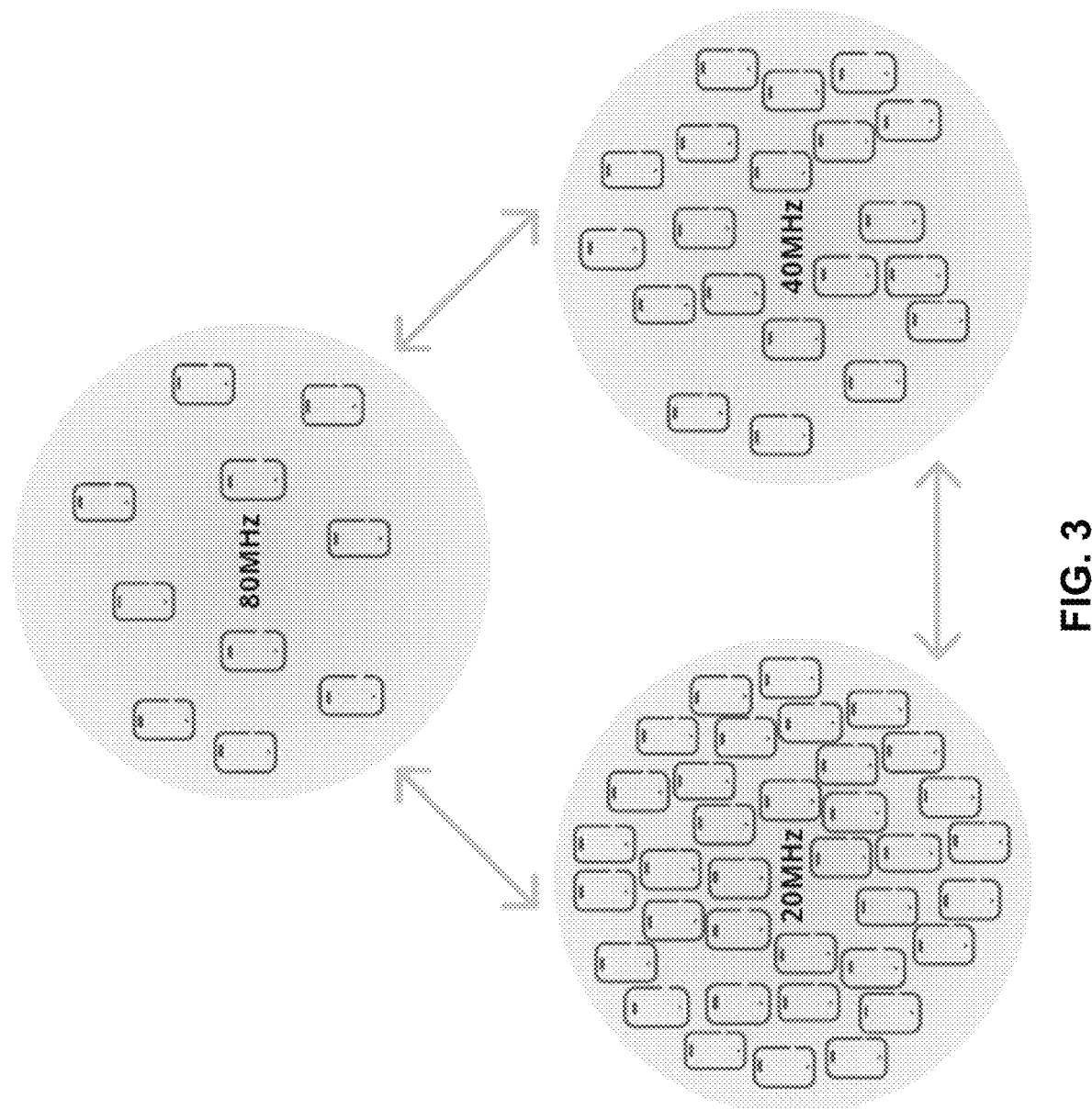
FIG. 3 illustrates a channel width adjustment in a high density environment, in accordance with embodiments of the application.

Dynamic radio management circuit 112 may provide dynamic bandwidth adjustments per changing device density, as further illustrated with FIG. 3. As illustrated in FIG. 3, analytics server 110 (via dynamic radio management circuit 112) may analyze the interactions between APs and density on the network. Dynamic radio management circuit 112 may automatically adjust channel widths between 20 MHz, 40 MHz, and 80 MHz (for illustrative purposes) to maximize system capacity and overall network efficiency. If device density increases, the channel width may automatically change to either 40 MHz or 20 MHz by dynamic radio management circuit 112 or device that is separate from the live upgrade process. If it decreases, then channel width will revert to the wider channel.

Density in a site may be determined based on average number of neighbors per AP, and average neighbor pathloss per AP. Higher density site may have higher number of average neighbors per AP, and lower average neighbor pathloss per AP. For very high density user sites such as lecture halls and stadiums where 20 MHz may be typically recommended, dynamic radio management circuit 112 may utilize real-time analytics to automatically change channel bandwidths from 80 MHz or 40 MHz to 20 MHz, and make ongoing adjustments based on overall network health. This may include identifying a number of devices in a high-density environment.

Dynamic radio management circuit 112 may determine one or more RF domains using various methods described herein (e.g., RF neighbor data and/or neighbor path loss data, graph theory, etc.). As illustrated in FIG. 4, two RF domains are shown, including RF domain 1 and RF domain 2. Each RF domain comprises a plurality of access points and a link between two nodes/APs indicates that those APs can receive the MAC beacon frames or Over the Air (OTA) data with a path loss value less than a threshold. This data may be included with the RF neighbor data. In some examples, the link in this graph indicates that the APs are one-hop neighbors. Between every two APs within an RF domain there may be a path that connects them, either directly or indirectly through other APs.

As illustrated in FIG. 4, APs 1-5 do not have any path to APs 6-10 and APs 1-5 fall into RF Domain 1 while APs 6-10 fall into RF Domain 2. Within RF Domain 1, every AP is one-hop neighbor to every other except AP5 and AP4. Hence RF partitions for AP5 and AP4 will be different and within an RF partition all APs are one-hop neighbors.

Figure 5:
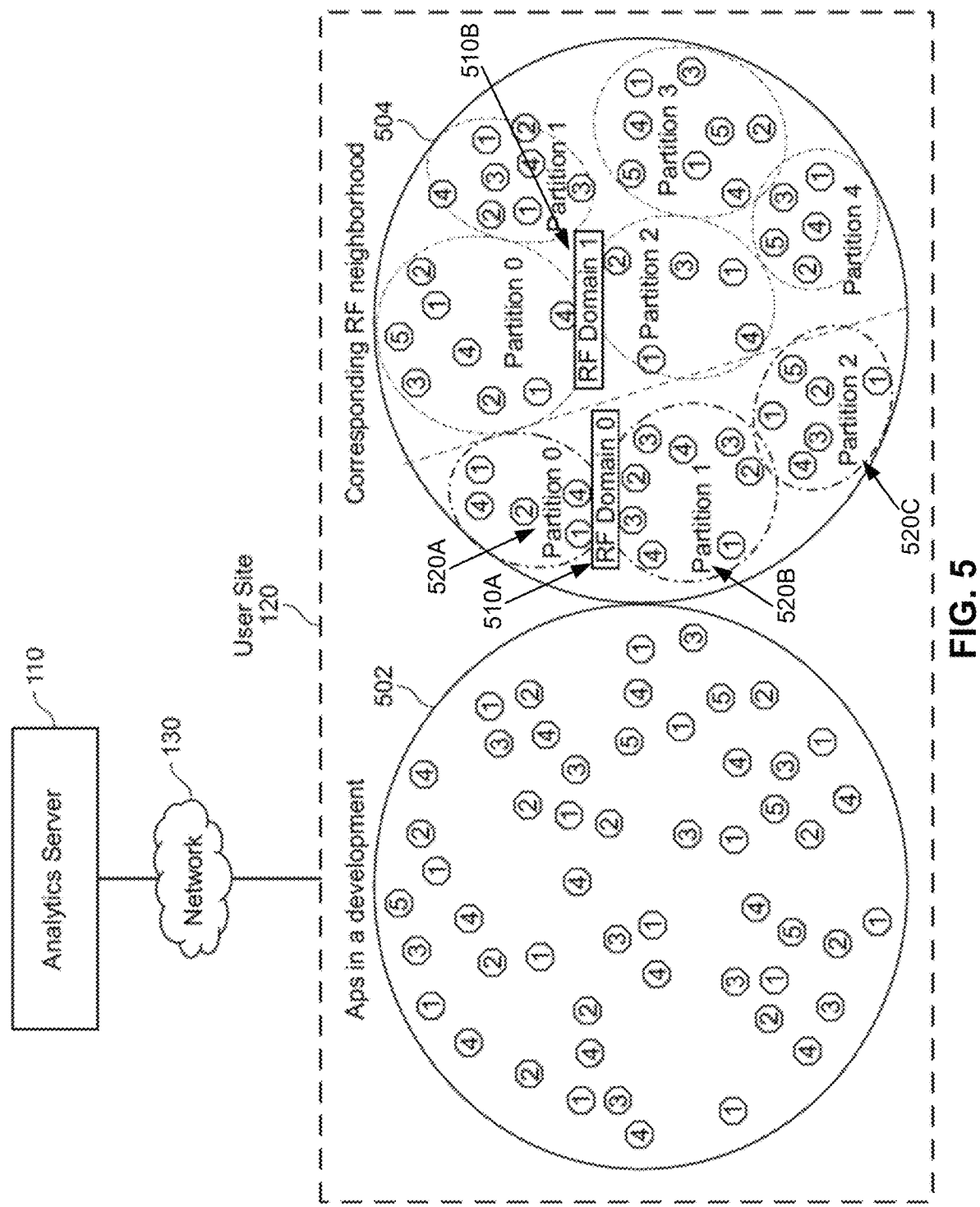
FIG. 5 illustrates a plurality of APs with corresponding RF domains and partitions, in accordance with embodiments of the application.

In addition to the determined RF domains, partitions may be determined within each RF domain, as illustrated in FIG. 5. For example, using the RF neighbor data across the entire network or a subset of the network (e.g., a controller cluster), dynamic radio management circuit 112 may algorithmically derive the partitions using RF neighbor data.

The RF neighbor data may be generated by each AP. For example, each AP may electronically correspond with other APs in the RF domain. Each AP may learn the pathloss for its neighbors from MAC beacon frames or Over the Air (OTA). For example, as defined in IEEE 802.11 (e.g., the set of local area network (LAN) protocols), the MAC beacon frame may comprise information about the device, including Service Set Identifier (SSID), one or more Basic Service Set Identifiers (BSSID), frequency channels, supported rates, and the like.

Each AP may periodically transmit RF neighbor data and/or neighbor path loss data to analytics server 110 via network 130, as shown in FIG. 5. Analytics server 110 may use the pathloss data to create connected weighted graph(s) where each node of the graph is one AP, and each edge of the graph is the link between an AP and a neighbor AP. If the pathloss metric between two APs is more than a threshold then it is not considered neighbor to that AP and if it is less than the threshold then it is considered a neighbor. APs within a partition of an RF domain can be considered as RF neighbors where a user device can roam without disassociation and data loss. Live upgrade circuit 114 can transmit a command to APs in different RF partitions in parallel such that user device can still associate with another AP in that RF partition once the APs perform an action in response to the command (e.g., reboot, restart a software application, etc.).

An illustrative grouping of partitions within each RF domain is illustrated in FIG. 5. For example, an entity associated with the user site 120 may correspond with multiple APs that may be visually unorganized to the entity. Each of the APs may be part of the same configuration group 502 but are physically present in different locations at user site 120. The repeated image of the configuration group 504 includes the same APs with identifiers for the separation of the APs by RF domain and partitions within each RF domain.

Configuration group 504 may comprise two RF domains, labeled as RF Domain 0 and RF Domain 1 in FIG. 5. The APs in the first RF domain may not be able to communicate with the APs in the second RF domain, as determined by neighbor data originating from and received by each AP. The APs may transmit the neighbor data (in addition to the pathloss data) to analytics server 110. The determination of the RF domains may be implemented by analytics server 110 (via dynamic radio management circuit 112) when analyzing which APs can communicate with each other through broadcast communications, as described herein.

Live upgrade circuit 114 is configured to upgrade APs 122 in association with an upgraded application file. For example, once the partitions are determined, live upgrade circuit 114 would request dynamic radio management circuit 112 provide the RF neighbor data and/or partition data (e.g., processed RF neighbor data) that it received earlier in the process. The RF neighbor data for these APs can resemble a separation of APs similar to the following:

| RF DOMAIN | RF PARTITION AND SITES |
|---|---|
| RF DOMAIN 1 | RF PARTITION 1 => SITE1 AP001, SITE1 AP002, SITE1 AP003, . . . , SITE1 AP100 |
| RF DOMAIN 1 | RF PARTITION 2 => SITE1 AP101, SITE1 AP102, . . . , SITE1 AP200 |

-continued

| RF DOMAIN | RF PARTITION AND SITES |
|---|---|
| RF DOMAIN 1 | ... |
| RF DOMAIN 1 | RF PARTITION N => SITE1 AP N001, SITE1 AP N002, ... |
| RF DOMAIN 2 | RF PARTITION 1 => SITE2 AP001, SITE2 AP002, SITE2 AP003, ... , SITE2 AP100 |
| RF DOMAIN 2 | RF PARTITION 2 => SITE 2 AP101, SITE2 AP102, ... , SITE2 AP200 |
| RF DOMAIN 2 | ... |
| RF DOMAIN 2 | RF PARTITION N => SITE2 AP N001, SITE2 AP N002, ... , SITE2 APN100 |
| ... | |
| RF DOMAIN N | RF PARTITION 1 => SITEN AP001, SITEN AP002, SITEN AP003, ... , SITEN AP100 |
| RF DOMAIN N | RF PARTITION 2 => SITEN AP101, SITEN AP102, ... , SITEN AP200 |
| RF DOMAIN N | ... |
| RF DOMAIN N | RF PARTITION N => SITEN AP N001, SITEN AP N002, ... , SITEN APN100 |

Additional determinations may be made as well. For example, an update to an application or file at the AP may be transmitted to each AP at a predetermined time threshold or interval (e.g., daily, every 4 hours, etc.) outside of the live upgrade process. The APs may receive these updates based on changing environmental conditions.

In some examples, the live upgrade process may be initiated with a client request. For example, the user device may choose the group 'X' for live upgrade which has multiple sites in that group. This request may contain all the Access Points (APs) in the entire group as determined by dynamic radio management circuit 112 of analytics server 110. Live upgrade circuit 114 may receive the request for the group of APs and retrieve the RF neighbor data for all the APs in the group.

Returning to FIG. 5, "RF domain 0" (or SITED 510A) and "RF domain 1" (or SITE1 510B) are illustrated. SITE1 510A comprises "partition 0," "partition 1," and "partition 2," which are illustrated as PARTITION-0 520A, PARTITION-1 5206, and PARTITION-2 520C. Each of these partitions include at least one AP that is labeled "1," or "AP 1" for illustrative purposes.

Live upgrade circuit 114 may select all APs that correspond with the label "AP 1" in each RF domain, including SITED 510A and SITE1 510B, and each RF partition in configuration group 504. This selection may correspond with fourteen total APs that may be upgraded concurrently and rebooted in parallel in accordance with the live upgrade process. All other remaining APs may wait for the upgrade file or further instruction from live upgrade circuit 114, while continuing to provide network connectivity to user devices at user site 120. Any client connected to "AP 1" in any RF domain or RF partition may implement a Layer Two (L2) roam to identify a second AP that is not subject to the upgrade or reboot command. The user device may automatically connect to the second AP in the same RF domain and RF partition during the live upgrade process.

In some examples, the user device may actively or passively scan for the AP. In active scanning, the user device may involve the user device sending a probe request on each channel it is configured to use (e.g., channels 1 to 11) and waiting for probe responses from APs. The user device then determines which AP is the ideal one to roam to. In passive scanning, the user device may not transmit any frames but rather listen for beacon frames on each channel. The user device may continue to change channels at a predetermined time threshold or interval, just as with active scanning, but the user device may not send probe requests.

Live upgrade circuit 114 may continue to upgrade APs at user site 120 for each AP in each RF partition within an RF domain independently. For example, live upgrade circuit 114 may select all APs labeled "AP 2" in each RF domain, including SITED 510A and SITE1 510B, and then all APs labeled "AP 3," then "AP 4," and "AP 5" and so on, so that each AP in each partition within an RF domain would upgrade independently without any user device connectivity issue. This way, the live upgrade process may be parallelized across RF domains and any AP rebooting or failing/delayed upgrades in one RF domain does not affect the upgrade in other RF domain.

Figure 6:
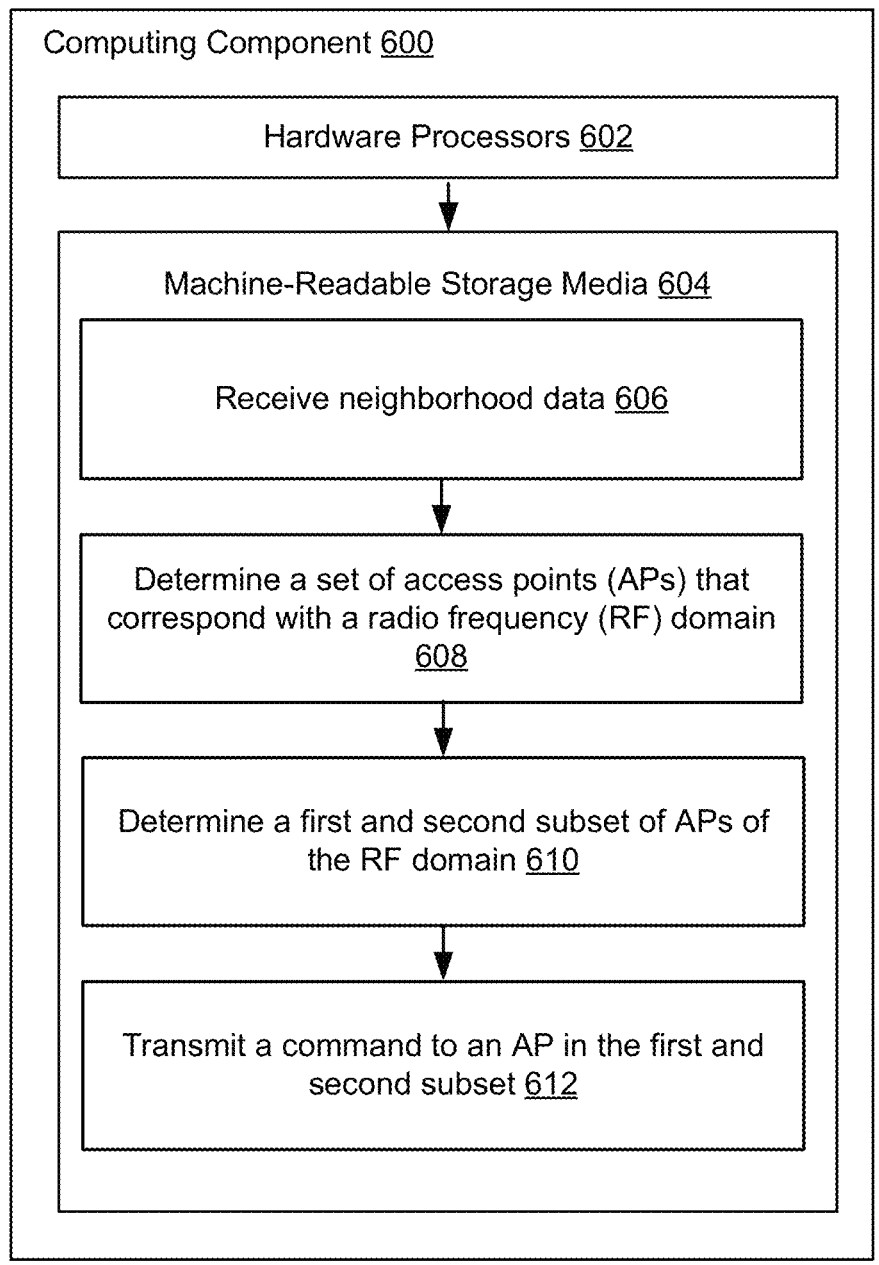
FIG. 6 illustrates a computing component for providing a key-based API neutralizer, in accordance with embodiments of the application.

FIG. 6 illustrates an example iterative process performed by a computing component 600 for performing a live upgrade of a plurality of APs using neighbor data. Computing component 600 may be, for example, a server computer, a controller, or any other similar computing component capable of processing data. In the example implementation of FIG. 6, the computing component 600 includes a hardware processor 602, and machine-readable storage medium 604. In some embodiments, computing component 600 may be an embodiment of analytics server 110 of FIG. 1.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-612, to control processes or operations for optimizing the system during run-time. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-612.

Hardware processor 602 may execute instruction 606 to receive neighbor data. For example, a central computing system may receive, from a plurality of access points (APs), neighbor data, wherein an AP of the plurality of APs provide network connectivity to a user device.

Hardware processor 602 may execute instruction 608 to determine a set of APs that correspond with a radio frequency (RF) domain. For example, a central computing system may determine a set of APs that correspond with a RF domain.

Hardware processor 602 may execute instruction 610 to determine one or more partitions with the RF domain. Each partition may correspond with a subset of the set of APs that correspond with an RF domain. For example, a central computing system may, within the set of APs that correspond with the RF domain, determine a first subset of the set of APs and a second subset of the set of APs. The APs in the first subset of the set of APs and APs in the second subset of the set of APs may not overlap.

Hardware processor 602 may execute instruction 612 to transmit a command to an AP in a first partition and an AP in a second partition. For example, a central computing system may transmit a command to an AP of the first subset of the set of APs and an AP of the second subset of the set of APs. The command may correspond with rebooting each AP or the like.

In some examples, the command disables network access to the user device communicatively connected with the AP of the first subset of the set of APs.

In some examples, the user device reconnects to a different AP in the first subset of the set of APs without moving locations.

In some examples, the AP of the second subset of the set of APs receive the command in parallel with the AP of the first subset of the set of APs.

In some examples, the set of APs provide roaming network connectivity without disassociation and data loss.

In some examples, the RF domain identifies a physical barrier separating the set of APs of the plurality of APs from a second set of APs of the plurality of APs.

In some examples, the neighbor data is received from the plurality of APs at a predetermined time threshold.

In some examples, the plurality of APs comprise a first AP communicatively connected with a second AP, and a third AP that is not communicatively connected with the first AP or the second AP, and the first AP and the second AP are included with the first subset of the set of APs and the third AP is not included with the first subset of the set of APs.

In some examples, the process may further comprise upgrading the AP of the first subset of the set of APs and the AP of the second subset of the set of APs with a faster upgrade than determining the first subset of the set of APs according to their base channels.

In some examples, the process may further comprise determining a second set of APs that correspond with a second RF domain and upgrading, in parallel with the set of APs, a second set of APs that correspond with the second RF domain.

In some examples, the second RF domain is in a separate building from the RF domain, and wherein the RF domain and the second RF domain are associated with a single entity.

Figure 7:
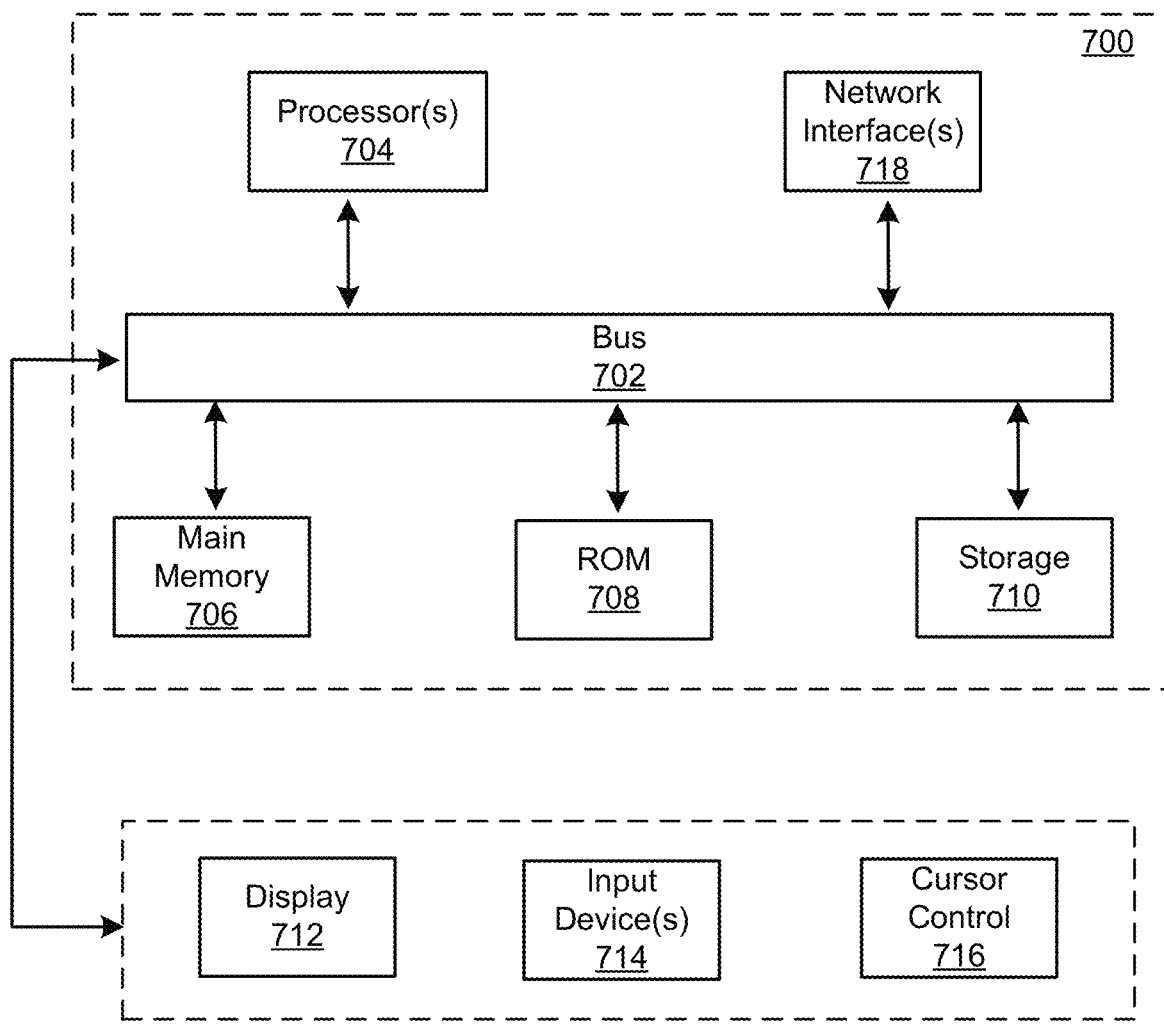
FIG. 7 is an example computing component that may be used to implement various features of embodiments described in the present disclosure.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicate with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A server for updating a plurality of access points (APs), the server comprising:
a memory; and
one or more processors configured to access the memory and execute machine readable instructions stored to:
receive, from the plurality of APs, neighbor data, wherein an AP of the plurality of APs provide network connectivity to a user device;
determine a set of APs that correspond with a radio frequency (RF) domain;
within the set of APs that correspond with the RF domain, determine a first subset of the set of APs and a second subset of the set of APs, wherein APs in the first subset of the set of APs and APs in the second subset of the set of APs do not overlap; and
transmit a command to an AP of the first subset of the set of APs and an AP of the second subset of the set of APs,
wherein the command disables network access to the user device communicatively connected with the AP of the first subset of the set of APs,
wherein the user device reconnects to a different AP in the first subset of the set of APs without moving locations, and
wherein the AP of the second subset of the set of APs receive the command in parallel with the AP of the first subset of the set of APs.

2. The server of claim 1, wherein the set of APs provide roaming network connectivity without disassociation and data loss.

3. The server of claim 1, wherein the RF domain identifies a physical barrier separating the set of APs of the plurality of APs from a second set of APs of the plurality of APs.

4. The server of claim 1, wherein the neighbor data is received from the plurality of APs at a predetermined time threshold.

5. The server of claim 1, wherein the plurality of APs comprise a first AP communicatively connected with a second AP, and a third AP that is not communicatively connected with the first AP or the second AP, and wherein the first AP and the second AP are included with the first subset of the set of APs and the third AP is not included with the first subset of the set of APs.

6. The server of claim 1, wherein the one or more processors are configured to access the memory and execute machine readable instructions stored to:
upgrade the AP of the first subset of the set of APs and the AP of the second subset of the set of APs with a faster upgrade than determining the first subset of the set of APs according to their base channels.

7. The server of claim 1, wherein the one or more processors are configured to access the memory and execute machine readable instructions stored to:
determine a second set of APs that correspond with a second RF domain; and
upgrade, in parallel with the set of APs, a second set of APs that correspond with the second RF domain.

8. The server of claim 7, wherein the second RF domain is in a separate building from the RF domain, and wherein the RF domain and the second RF domain are associated with a single entity.

9. A method for updating a plurality of access points (APs), the method comprising:
receiving, from the plurality of APs, neighbor data, wherein an AP of the plurality of APs provide network connectivity to a user device;
determining a set of APs that correspond with a radio frequency (RF) domain;
within the set of APs that correspond with the RF domain, determining a first subset of the set of APs and a second subset of the set of APs, wherein APs in the first subset of the set of APs and APs in the second subset of the set of APs do not overlap; and
transmitting a command to an AP of the first subset of the set of APs and an AP of the second subset of the set of APs,
wherein the command disables network access to the user device communicatively connected with the AP of the first subset of the set of APs,
wherein the user device reconnects to a different AP in the first subset of the set of APs without moving locations, and
wherein the AP of the partition of the second subset of the set of APs receive the command in parallel with the AP of the first subset of the set of APs.

10. The method of claim 9, wherein the set of APs provide roaming network connectivity without disassociation and data loss.

11. The method of claim 9, wherein the RF domain identifies a physical barrier separating the set of APs of the plurality of APs from a second set of APs of the plurality of APs.

12. The method of claim 9, wherein the neighbor data is received from the plurality of APs at a predetermined time threshold.

13. The method of claim 9, wherein the plurality of APs comprise a first AP communicatively connected with a second AP, and a third AP that is not communicatively connected with the first AP or the second AP, and wherein the first AP and the second AP are included with the first subset of the set of APs and the third AP is not included with the first subset of the set of APs.

14. The method of claim 9, further comprising:
upgrading the AP of the first subset of the set of APs and the AP of the second subset of the set of APs with a faster upgrade than determining the first subset of the set of APs according to their base channels.

15. The method of claim 9, further comprising:
determining a second set of APs that correspond with a second RF domain;
upgrading, in parallel with the set of APs, a second set of APs that correspond with the second RF domain.

16. The method of claim 15, wherein the second RF domain is in a separate building from the RF domain, and wherein the RF domain and the second RF domain are associated with a single entity.

17. A non-transitory computer-readable storage medium storing a plurality of instructions executable by one or more processors, the plurality of instructions when executed by the one or more processors cause the one or more processors to:
receive, from a plurality of access points (APs), neighbor data, wherein an AP of the plurality of APs provide network connectivity to a user device;
determine a set of APs that correspond with a radio frequency (RF) domain;
within the set of APs that correspond with the RF domain, determine a first subset of the set of APs and a second subset of the set of APs, wherein APs in the first subset of the set of APs and APs in the second subset of the set of APs do not overlap; and transmit a command to an AP of the first subset of the set of APs and an AP of the second subset of the set of APs,
wherein the command disables network access to the user device communicatively connected with the AP of the first subset of the set of APs,
wherein the user device reconnects to a different AP in the first subset of the set of APs without moving locations, and
wherein the AP of the second subset of the set of APs receive the command in parallel with the AP of the first subset of the set of APs.

18. The non-transitory computer-readable storage medium of claim 17, wherein the set of APs provide roaming network connectivity without disassociation and data loss.

19. The non-transitory computer-readable storage medium of claim 17, wherein the RF domain identifies a physical barrier separating the set of APs of the plurality of APs from a second set of APs of the plurality of APs.

20. The non-transitory computer-readable storage medium of claim 17, wherein the neighbor data is received from the plurality of APs at a predetermined time threshold.

* * * * *